(12) United States Patent  (10) Patent No.: US 7,194,185 B2
Watanabe  (45) Date of Patent: Mar. 20, 2007

(54) ELECTRONIC DEVICE HAVING MULTIPLE LEDS

(75) Inventor: Yasunori Watanabe, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 241 days.

(21) Appl. No.: 10/743,033

(22) Filed: Dec. 23, 2003

(65) Prior Publication Data

US 2004/0136682 A1 Jul. 15, 2004

(30) Foreign Application Priority Data

Dec. 24, 2002 (JP) ............................. 2002-371515

(51) Int. Cl.
G02B 6/00 (2006.01)
F21V 7/04 (2006.01)
(52) U.S. Cl. ...................................... 385/146; 362/551
(58) Field of Classification Search ...................... None
See application file for complete search history.

(56) References Cited

U.S. PATENT DOCUMENTS

| 5,581,683 | A * | 12/1996 | Bertignoll et al. .......... 385/146 |
| 5,785,404 | A * | 7/1998 | Wiese ......................... 362/555 |
| 6,350,041 | B1 * | 2/2002 | Tarsa et al. .................. 362/231 |
| 6,558,013 | B2 * | 5/2003 | Tholin et al. ................. 362/29 |
| 6,574,414 | B2 * | 6/2003 | Schechtel et al. ........... 385/146 |
| 6,592,238 | B2 * | 7/2003 | Cleaver et al. .............. 362/249 |
| 6,961,190 | B1 | 11/2005 | Tamaoki et al. |
| 2005/0168987 | A1 | 8/2005 | Tamaoki et al. |

FOREIGN PATENT DOCUMENTS

| JP | 07074811 A | * | 3/1995 |
| JP | A-7-296615 | | 11/1995 |
| JP | B2 2639999 | | 5/1997 |
| JP | B2 2889913 | | 2/1999 |
| JP | A-11-232912 | | 8/1999 |
| JP | A-11-329042 | | 11/1999 |
| JP | A 2000-268619 | | 9/2000 |
| JP | A-2001-275488 | | 10/2001 |
| JP | A-2001-297612 | | 10/2001 |
| JP | A-2001-356247 | | 12/2001 |
| JP | A-2002-298612 | | 10/2002 |

* cited by examiner

Primary Examiner—Sung Pak
(74) Attorney, Agent, or Firm—Oliff & Berridge, PLC (57) ABSTRACT

An electronic device including a cover, a first LED that is installed inside the cover, the first LED emitting light of a first color, a second LED that is installed inside the cover, the second LED emitting light of a second color and a first light guide that guides the light from the first LED and the second LED towards an outside of the cover, the light of the first color and the light of the second color being blended inside the first light guide, wherein the first LED or the second LED and the first light guide are formed as separate and detachable units.

25 Claims, 9 Drawing Sheets

ELECTRONIC DEVICE HAVING MULTIPLE LEDS

BACKGROUND OF THE INVENTION

1. Field of Invention

The invention relates to an electronic device having multiple LEDs and a light guide that blends and guides the light emitted from the LEDs.

2. Description of Related Art

There exists an LED device equipped with a first LED for emitting light of a first color, a second LED for emitting light of a second color, and a light guide for guiding the light from the first and the second LEDs. The first and the second LEDs are arranged such that light from the first color and light from the second color blend inside the light guide. The invention described in Japanese Patent Publication 2639999 is an example of this type of LED device. In the LED device described in Japanese Patent Publication 2639999, a third LED is established in addition to the first and the second LEDs, and full-color light is outputted from the light guide as a result of the combination of the three colors emitted from the LEDs in the light guide. In the LED device described in Japanese Patent Publication 2639999, multiple LEDs and light guides are molded together and formed as one unit in order to efficiently output light emitted from the LEDs.

SUMMARY OF THE INVENTION

The invention thus provides an electronic device that can increase the amount of freedom in the design of the LED and the light guide. The electronic device of the invention can also be applied to image formation devices such as printers, facsimiles, and cameras, for example.

The invention, according to a first exemplary aspect, includes an electronic device with a cover, a first LED that is installed inside the cover, the first LED emitting light of a first color, a second LED that is installed inside the cover, the second LED emitting light of a second color, and a first light guide that guides the light from the first LED and the second LED towards an outside of the cover, the light of the first color and the light of the second color being blended inside the first light guide, wherein the first LED or the second LED and the first light guide are formed as separate and detachable units.

With the electronic device, light of a first color and light of a second color are blended inside the first light guide, forming light of blended colors. Moreover, because the first LED and the second LED are formed as separate and detachable units from the first light guide, it is possible to increase the amount of freedom in the design of the LED and the light guide when compared to LEDs and light guides that are formed as a single molded unit.

BRIEF DESCRIPTION OF THE DRAWINGS

Various embodiments of the invention will be described with reference to the drawings, wherein.

DETAILED DESCRIPTION OF PREFERRED EMBODIMENTS

Figure 1:
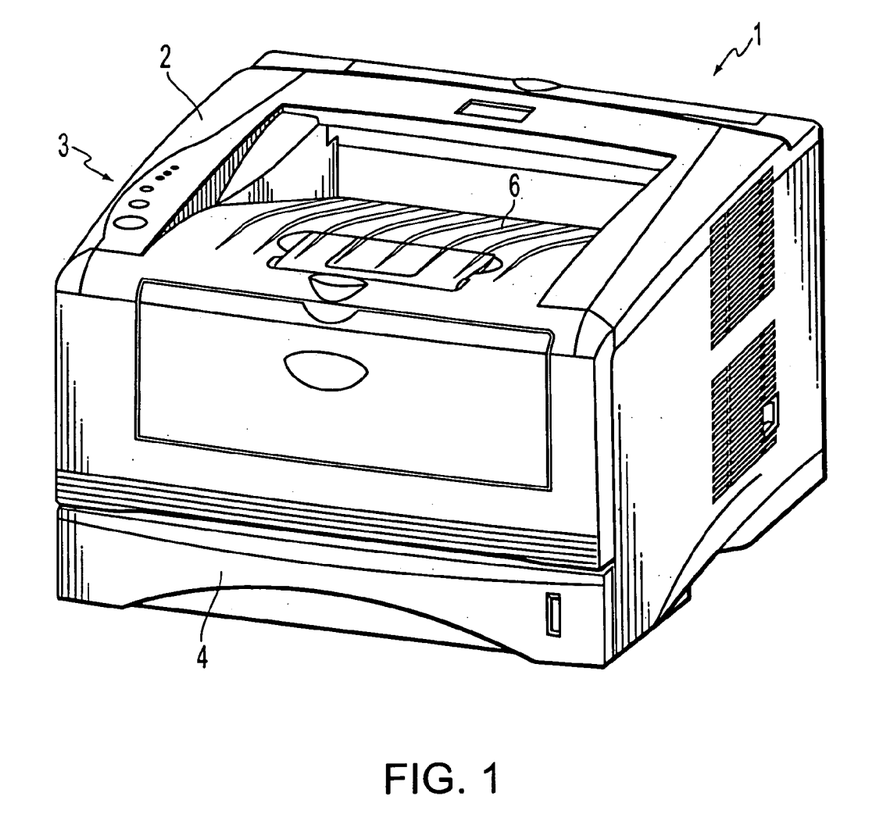
FIG. 1 is an oblique view of an embodiment of a laser printer to which the electronic device of the invention is applied.

Embodiments of the invention will be explained hereinafter with reference to the attached drawings. FIG. 1 is an oblique view of a laser printer to which the electronic device of the invention is applied, and FIG. 2 is a block diagram showing the main components of the laser printer shown in FIG. 1.

As shown in FIG. 1, a laser printer 1 has a roughly box-shaped body cover 2 and a display panel 3 that is installed on the top surface of this body cover 2. Multiple indicator lights are established on the display panel 3 and the operation state of the laser printer 1 is displayed by the lighting of the indicator lights. Moreover, operating switches that the user can operate are established on the display panel 3 and various operations are conducted by pressing these switches.

A paper feeding cassette 4 is installed on the lower portion of the body cover 2 and the paper feeding cassette 4 is configured such that the paper feeding cassette can hold stacks of paper and can be easily inserted into and removed from body cover 2. Paper that is stored in the paper feeding cassette 4 is fed to an image formation unit 5 (FIG. 2) inside the body cover 2. After images are printed by the image formation unit 5, the pages are dispensed to a dispense tray 6.

Figure 2:
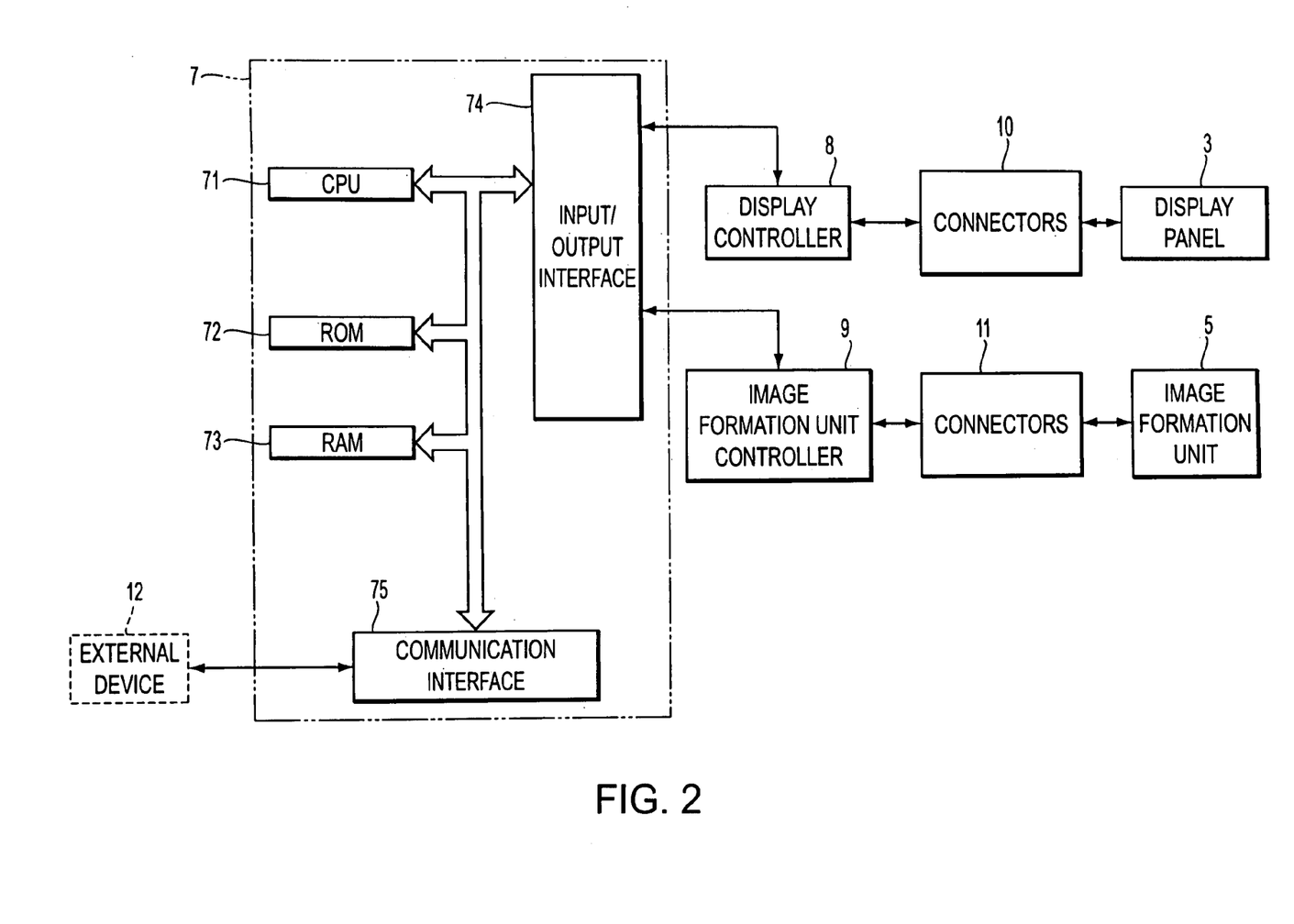
FIG. 2 is a block diagram showing the main components of the laser printer shown in FIG. 1.

As shown in FIG. 2, the laser printer 1 is equipped with the display panel 3, the image formation unit 5, which is equipped with various mechanisms and sensors necessary for image formation, and a controller 7 that performs specific communications with the display panel 3 and the image formation unit 5 and performs specific print control processing. The controller 7 is equipped with a CPU 71 that outputs control signals to various mechanisms within the laser printer 1 based on particular control programs, a ROM 72 that stores various control programs, a RAM 73 that stores various types of memory such as a reception buffer and that stores printing data received from an external device such as a personal computer or a host computer, an input/output interface (called "input/output I/F" hereafter) 74, and a communication interface (called "communication I/F" hereafter) 75. These are connected through an internal buses.

Furthermore, a display controller 8 and an image formation unit controller 9 are connected to the input/output I/F 74. Moreover, an external device 12 is connected to the communication I/F 75. On the other hand, the image formation unit 5 is equipped with various circuits such as (a) a main motor drive circuit for driving the main motor that rotates the paper feeding roller, the registration roller, the photosensitive drum, the heating roller, the paper dispensing roller, and the feeding roller, (b) an electric field generating circuit that generates a high-voltage electric field in the photosensitive drum, the transcription roller, the charger, the developing roller, and the cleaning roller, and (c) a fixing heater drive circuit for operating a fixing heater inside the heating roller, and various sensors such as (i) a sensor that detects the amount of toner remaining, (ii) a paper feeding sensor that detects the paper feeding status, and (iii) a paper dispensing sensor that detects the paper dispensing state.

The display controller 8 is connected to the display panel 3 through a connector 10, and the image formation unit controller 9 is connected to the image formation unit 5 through a connector 11. Moreover, the CPU 71 sends a signal related to the display of the operation state of the laser printer 1 to the display controller 8, and causes the display panel 3 to display particular information. Meanwhile, the display panel 3 accesses the image formation unit 5 through the image formation unit controller 9, sends specific control signals to various circuits, and receives output signals from various sensors.

Figure 3:
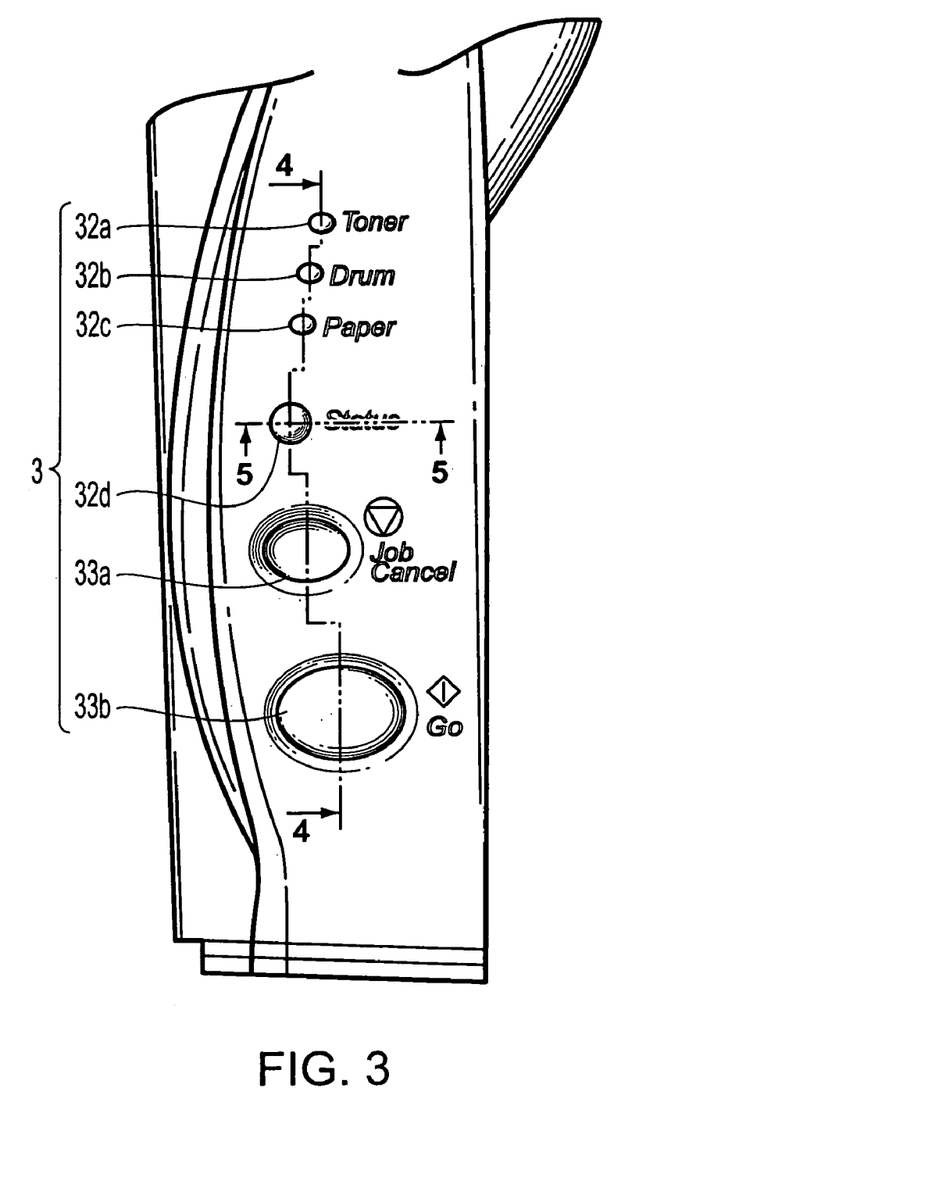
FIG. 3 is an enlarged view of components such as the display panel shown in FIG. 1.

FIG. 3 is an enlarged view of the display panel 3 shown in FIG. 1. As shown in FIG. 3, an indicator light 32a, an indicator light 32b, an indicator light 32c, an indicator light 32d, an operation button 33a, and an operation button 33b are installed on the display panel 3. Through the lighting and extinguishing of each display light, the indicator light 32a displays information related to the amount of toner remaining, the indicator light 32b displays information related to the life of the drum unit, and the indicator light 32c displays information related to paper jams and scrap paper. The indicator light 32d is able to light up with three colors—green, red, and a mixture of green and red. Using the method described below, the indicator light 32d displays information related to the printing state. The indicator light 32d lights up green to show the "printing possible state," and lights up red to show that the printer is "processing printing data." The indicator light 32d lights up a mixture of green and red when the printer is "printing." As should be appreciated, any color can be used and any color combination can be used. Moreover, information related to any error of the laser printer 1 is displayed using any various number of combinations of lighting using the indicator lights 32a, 32b, 32c, and 32d. Furthermore, by pressing the operation button 33a, the user cancels printing that is underway. Moreover, the printing process is temporarily paused when the operation button 33b is pressed during printing, and printing is resumed when the operation button 33b is pressed once again.

Figure 4:
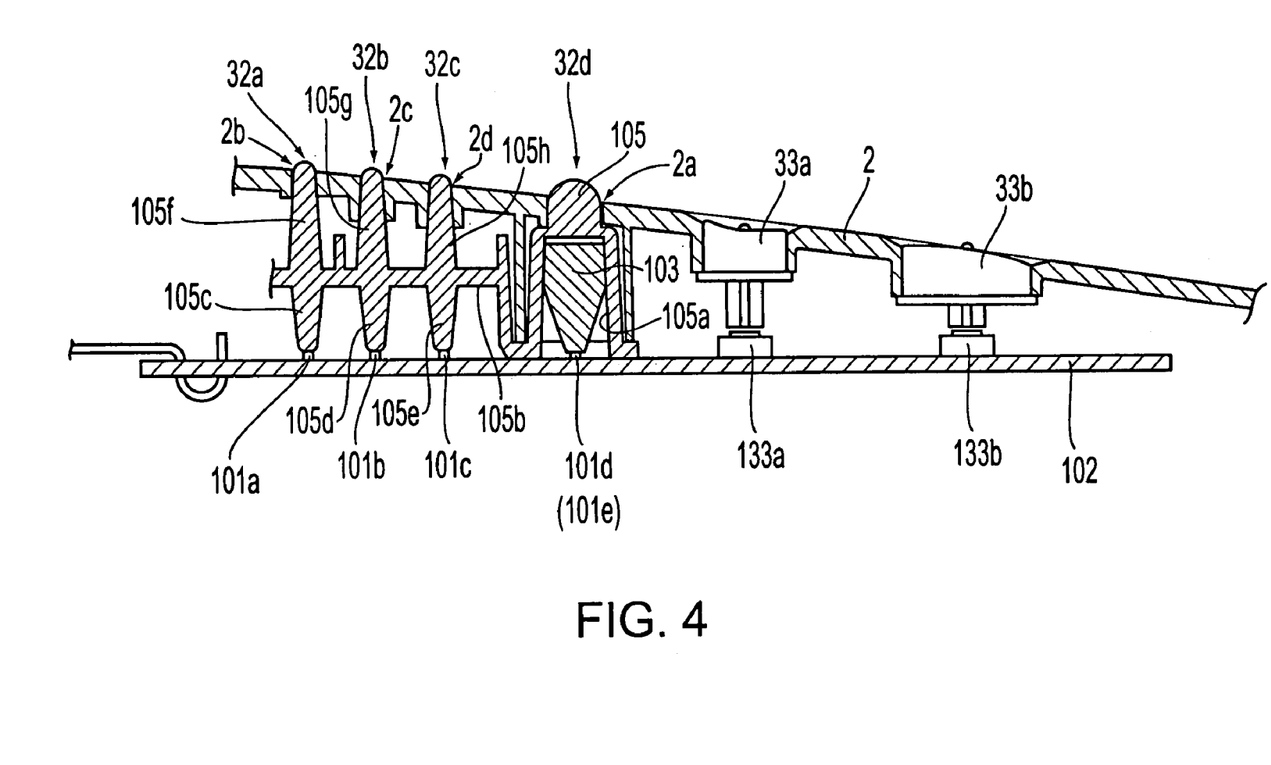
FIG. 4 is a 4—4 cross-sectional view of FIG. 3.
Figure 5:
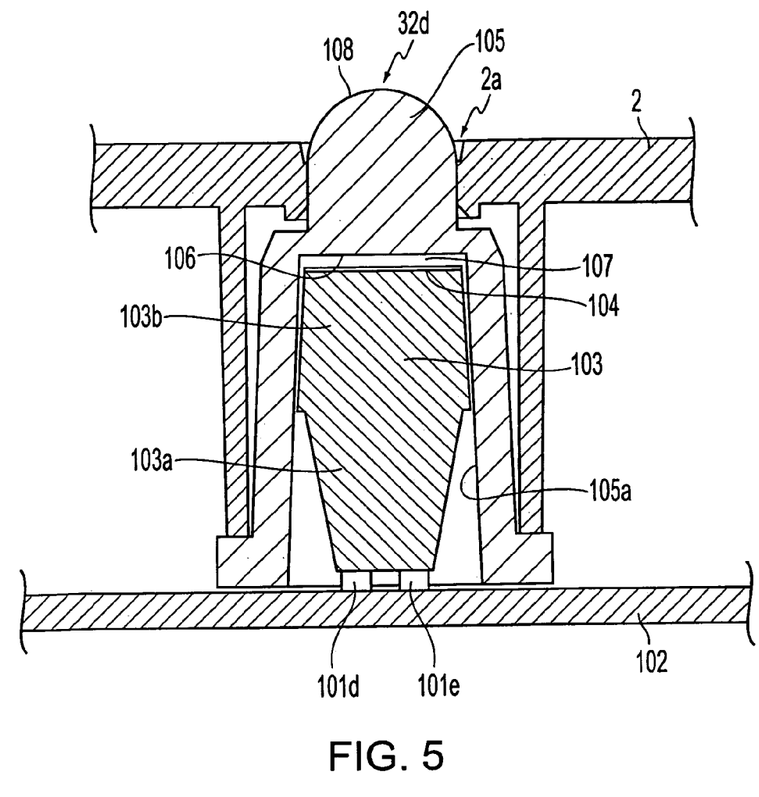
FIG. 5 is a 5—5 enlarged cross-sectional view of FIG. 3.

FIG. 4 is a 4—4 cross-sectional view of FIG. 3, and FIG. 5 is an 5—5 enlarged cross-sectional view of FIG. 3. As shown in FIGS. 4 and 5, a substrate 102 is fixed to the body cover 2 with screws (not shown) on the inside of the body cover 2.

LED 101a which lights indicator light 32a, LED 101b which lights indicator light 32b, and LED 101c which lights indicator light 32c, are established on the substrate 102. In order to light the indicator light 32d, LED 101d which emits green light as the first color, and LED 101e which emits red light as the second color, are established on the substrate 102.

LEDs 101a through 101e are directly connected to the substrate 102 through soldering using automated equipment. Substrate 102 is fixated to the body cover 2 with screws, so space required for screw cramps is formed between the substrate 102 and the body cover 2. In this space, a first light guide 103, which guides light from the LED 101d and the LED 101e to the outside of the body cover 2, is installed such that the first light guide 103 makes contact with the LED 101d and the LED 101e. The first light guide 103 is molded from acryl, so that the first light guide 103 has good light transmission and is difficult to crack. As shown in FIG. 5, the LED 101d and the LED 101e are installed adjacently to one another. Therefore, the light from the LED 101d and the light from the LED 101e blends inside the first light guide 103, and the light is then outputted from the first light guide 103. Moreover, the LED 101d and the first light guide 103 are formed as separate, detachable units, and the LED 101e and the first light guide 103 are also formed as separate, detachable units.

Figure 6:
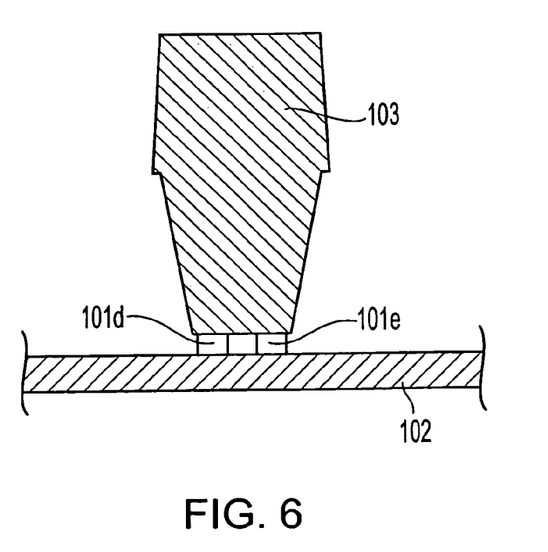
FIG. 6 shows a longitudinal section of the first light guide shown in FIGS. 4 and 5.

FIG. 6 shows the longitudinal section shape of the first light guide 103 shown in FIGS. 4 and 5. The longitudinal section shape of the first light guide 103 of the first embodiment shown in FIG. 6 has a shape formed by the juxtaposition of two trapezoids. The trapezoid has an upper base and a lower base, and the upper base is the short side and the lower base is the long side. The first light guide 103 of the first embodiment is a shape combining a first trapezoid part 103a on the side of the LEDs 101d and 101e and a second trapezoid part 103b on the side of body cover 2. The first light guide 103 is formed by uniting the lower base (long side) of the first trapezoid part 103a and the lower base (long side) of the second trapezoid part 103b.

The LED 101d and the LED 101e are installed in close proximity to one another, so the light from the LEDs 101d and 101e is sufficiently inputted into the light guide 103, even if the short side of the first trapezoid part 103a is established in close proximity to the LEDs 101d and 101e. Simply stated, even if the width of the side of the first light guide 103 that is close to the LEDs 101d and 101e is made relatively narrow, the performance of the first light guide 103 will not be affected.

As shown in FIGS. 4 and 5, the first light guide 103 is installed such that it makes contact with the LEDs 101d and 101e. It is thus possible to increase the amount of light that penetrates into the first light guide 103. Moreover, if no defects are found in the first light guide 103, the LED 101d, and the LED 101e, they may be adhered to one another at the time of assembly. Alternatively, they may be assembled without adhering them to one another, and in this case, it is easy to disassemble the parts when the device is recycled. If the first light guide 103 is installed with spacing from the LEDs 101d and 101e, then light from the LEDs 101d and 101e will be reflected off the inlet surface of the first light guide 103, so the amount of light that passes through the inlet surface of the first light guide 103 and penetrates into the first light guide 103 will be reduced. Therefore, the structure of the first embodiment is suited for obtaining a sufficient amount of light.

As shown in FIGS. 4 and 5, a scattering member 104, which scatters light from the LEDs 101d and 101e that is guided by the first light guide 103 is established on the first light guide 103 of the first embodiment. Scattering member 104 is installed on a side of the first light guide 103 opposite the LEDs 101d and 101e. Stated simply, scattering member 104 scatters light that is emitted from the LEDs 101d and 101e and passes through the first light guide 103. A thin transparent film is used for the scattering member 104, and this contributes to the compactness of the first light guide 103. Moreover, materials other than films may also be used for the scattering member 104.

Moreover, a second light guide 105 for the purpose of guiding light from the LED 101d or the LED 101e that is guided by the first light guide 103 is installed such that the second light guide 105 is exposed from opening 2a, which is formed in body cover 2. The second light guide 105 guides light from the LED 101d or 101e to the outside of body cover 2, and the second light guide 105 allows the user of the printer 1 to see the light. Like the first light guide 103, the second light guide 105 is molded from acryl, so the second light guide 105 has good light transmission and is difficult to crack. A concave part 105a, which is opened on the substrate 102 side of the second light guide 105, is formed. Also, the first light guide 103 and the scattering member 104 are installed inside this concave part 105a. Scattering member 104 is installed between the first light guide 103 and the second light guide 105. A surface 106 that opposes the first light guide 103 and the scattering member 104 inside the concave part 105a of the second light guide 105 is formed into a flat surface.

A gap 107 is established between the first light guide 103 and the second light guide 105. Moreover, surface-treatment such as texturing is performed on a portion 108 of the surface of the second light guide 105 that is exposed to the outside of body cover 2, so that light from the LED 101d or the LED 101e that is guided by the second light guide 105 is diffusely reflected.

As shown in FIG. 4, a stem 105b is formed together with the second light guide 105. Branches 105c, 105d, and 105e that respectively extend in directions close to the LED 101a, the LED 101b, and the LED 101c are formed together with the stem 105b. In the opposite direction as the branches 105c, 105d, and 105e, the branches 105f, 105g, and 105h, which are respectively exposed from the openings 2b, 2c, and 2d established on the cover 2, are formed together with the stem 105b. Therefore, the light that is emitted from the LED 101a is outputted to the outside of the cover 2 through the branches 105c and 105f. Light that is emitted from the LED 101b is outputted to the outside of the cover 2 through the branches 105d and 105g. Light that is emitted from the LED 101c is outputted to the outside of the cover 2 through the branches 105e and 105h.

Figure 7:
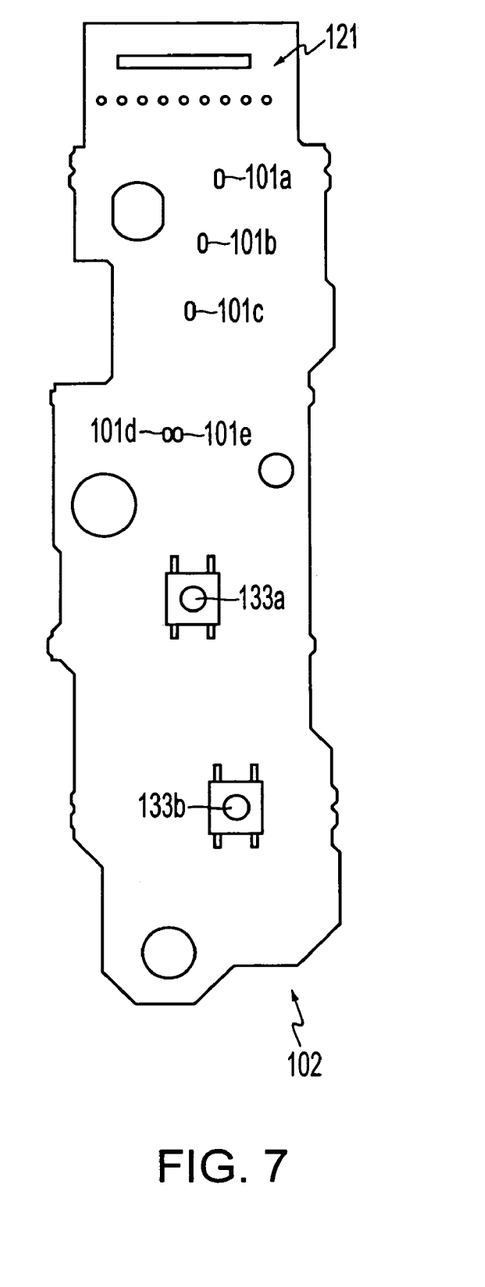
FIG. 7 is a plan view of the substrate shown in FIGS. 3 through 6.

FIG. 7 is a plan view of the substrate 102. A connector 121, which connects the substrate 102 to other substrates, is established on the substrate 102. Moreover, a switch 133a and a switch 133b are established on the substrate 102. The switches 133a and 133b are directly connected to the substrate 102 through soldering using automated equipment. The switch 133a is established opposite the operation button 33a, and the switch 133a is ON only when the operation button 33a is pressed. The switch 133a is OFF when the operation button 33a is not pressed. A switch 133b is established opposite the operation button 33b, and the switch 133b is ON only when the operation button 33b is pressed. The switch 133b is OFF when the operation button 33b is not pressed.

During the first mode, in which the "printing possible state" is shown, light from the green LED 101d is emitted, and light from the red LED 101e is not emitted. As a result, the indicator light 32d lights up green. During the second mode, in which the "processing printing data" status is shown, light from the red LED 101e is emitted, and light from the green LED 101d is not emitted. As a result, the indicator light 32d lights up red. During the third mode, in which the "printing" status is shown, light from both the green LED 101d and the red LED 101e is emitted, and the green light and the red light blend inside the first light guide 103. Furthermore, the blended light is scattered by the scattering member 104, and the green light and the red light is thereby more favorably blended. The favorably blended light is then guided to the outside of the body cover 2 by the second light guide 105. As a result, the indicator light 32d lights up with a mixture of green and red light. The user of printer 1 thus is able to confirm the operation status of the printer 1 by looking at the light emission status of the indicator light 32d.

Through the configuration of the first embodiment, as shown in FIG. 5, light of a first color that is emitted from the LED 101d and light of a second color that is emitted from the LED 101e are blended, and light of the blended colors is outputted. Furthermore, the LED 101d or the LED 101e and the first light guide 103 are formed as separate units. Therefore, even when the first light guide 103 has molding defects, only the first light guide 103 should be disposed of. It is also possible to combine normal LEDs 101d and 101e, which are installed in close proximity to this the first light guide 103, with another normal LED in close proximity to the first light guide 103 without disposing of the LEDs 101d and 101e.

Moreover, even when defects are found in the LED 101d or the LED 101e, after the LEDs 101d, 101e and the first light guide 103 are attached, only the substrate 102 on which the LEDs 101d and 101e are placed should be disposed. There is no need to dispose of the first light guide 103 in order to attach other LEDs 101d and 101e until with the first light guide 103.

Furthermore, even when design changes of the first light guide 103 become necessary, only the first light guide 103 prior to the design changes should be disposed. It is not necessary to dispose of the LEDs 101d and 101e that are attached to the first light guide 103. As such, it is possible to attach the LEDs 101d and 101e to the first light guide 103 that incorporates the new design changes.

Moreover, through the first embodiment, as shown in FIGS. 4 and 5, because the LEDs 101d and 101e are established on the substrate 102, it is possible to automate the connection operation with the LEDs 101d and 101e and the substrate 102. Furthermore, through the first embodiment, as shown in FIG. 6, because the longitudinal section shape of the first light guide 103 is a shape formed by combining two trapezoids, it is possible to easily remove the first light guide 103, which is formed through molding, from a die.

Moreover, through the first embodiment, as shown in FIG. 5, the first light guide 103 is installed such that the first light guide 103 makes contact with the LEDs 101d and 101e. More specifically, the first light guide 103 is installed such that the first light guide 103 makes contact with at least one of the LED 101d and the LED 101e. It is therefore possible to increase the amount of light that penetrates into the first light guide 103. If the first light guide 103 is installed with spacing from the LEDs 101d and 101e, then light from the LEDs 101d and 101e will be reflected off the inlet surface of the first light guide 103. As such, the amount of light that passes through the inlet surface of the first light guide 103 and that penetrates into the first light guide 103 will be reduced.

Furthermore, through the first embodiment, as shown in FIG. 5, the scattering member 104 for the purpose of scattering light from the LEDs 101d and 101e that is guided by the first light guide 103 is established on the first light guide 103. It is therefore possible to favorably blend light from the LED 101d and light from the LED 101e and favorably scatter the light towards the second light guide 105.

Moreover, through the first embodiment, as shown in FIG. 5, the scattering member 104 is installed on the opposite side as the LEDs 101d and 101e on the first light guide 103. It is therefore possible to more favorably blend the light from the LED 101d and the light from the LED 101e in comparison to the case in which the scattering member is installed between the LEDs 101d and 101e and the first light guide 103. Furthermore, through the first embodiment, as shown in FIGS. 4 and 5, the second light guide 105, for the purpose of guiding to the outside of the body cover 2 light from the LED 101*d* or the LED 101*e* that is guided by the first light guide 103, is installed separately from the first light guide 103. Therefore, when the design of the distance between the LED 101*d* or the LED 101*e* and the cover is changed, it is possible to simply change the design of either the first light guide 103 or the second light guide 105, and use the other as it is.

Moreover, by installing the scattering member 104 between the first light guide 103 and the second light guide 105, it is possible to protect the scattering member 104. Furthermore, through the first embodiment, as shown in FIG. 5, the surface 106 of the second light guide 105 that opposes the first light guide 103 is formed into a flat surface, so that light from the LEDs 101*d* and 101*e* that is guided by the first light guide 103 can easily penetrate into the second light guide 105.

If the surface 106 of the second light guide 105 that opposes the first light guide 103 temporarily becomes a concave surface, then it will become difficult for light from the LEDs 101*d* and 101*e* that is guided by the first light guide 103 to penetrate into the second light guide 105. Moreover, through the first embodiment, as shown in FIG. 5, because the gap 107 is established between the first light guide 103 and the second light guide 105, it is possible to absorb the common difference between the first light guide 103 and the second light guide 105 with this gap 107, and the structures of the first light guide 103 and the second light guide 105 are simplified.

Furthermore, through the first embodiment, as shown in FIG. 5, surface-treatment by texturing is performed on the portion 108 of the surface of the second light guide 105 that is exposed to the outside of the body cover 2 such that light from the LED 101*d* or the LED 101*e* that is guided by the second light guide 105 is diffusely reflected. It is therefore possible to improve visibility for the user.

Moreover, through the first embodiment, as shown in FIG. 7, other LEDs 101*a*, 101*b*, and 101*c* are established on the substrate 102 on which the LEDs 101*d* and 101*e* are established. In other words, the substrate is doubly used as the substrate 102 for the LEDs 101*d* and 101*e* and as the substrate 102 for the other LEDs 101*a*, 101*b*, and 101*c*. It is therefore possible to reduce the number of parts in comparison to the case in which the substrate 102 for the other the LEDs 101*a*, 101*b*, and 101*c* is established separately from the substrate 102 for the LEDs 101*d* and 101*e*.

Furthermore, through the first embodiment, as shown in FIG. 4, the second light guide 105 is installed in close proximity to the other LEDs 101*a*, 101*b*, and 101*c*. In other words, the second light guide 105 extends to a position that is close to the other LEDs 101*a*, 101*b*, and 101*c*. It is therefore possible to avoid the situation in which the number of parts increases, which results from configurations in which another light guide is established separately between the other LEDs 101*a*, 101*b*, and 101*c* and the second light guide 105.

Moreover, through the first embodiment, as shown in FIG. 7, because the connector 121 is established on the substrate 102, on which the LEDs 101*d* and 101*e* are established, it is possible to use the substrate 102 for the LEDs 101*d* and 101*e* independently from other substrates.

Furthermore, through the first embodiment, as shown in FIG. 7, other electronic parts (for example, switch 33*a*, switch 33*b*, etc.) are also soldered to the substrate 102, to which LEDs 101*d* and 101*e* are soldered. It is therefore possible to avoid the situation in which the number of parts increases, which results from configurations in which another substrate is established for other electronic parts.

Moreover, through the first embodiment, as described above, a first mode in which light from the LED 101*d* is emitted while light from the LED 101*e* is not emitted, a second mode in which light from the LED 101*e* is emitted while light from the LED 101*d* is not emitted, and a third mode in which light from both LEDs 101*d* and 101*e* are emitted as established. It is therefore possible to form light of three different colors with the two LEDs 101*d* and 101*e*.

Furthermore, through the first embodiment, the substrate 102 is fixated to the body cover 2 with screws, so that the distance between the substrate 102 and the body cover 2 is fixed. The first light guide 103, the scattering member 104, and the second light guide 104 also favorably blend light from the LEDs 101*d* and 101*e* and guide this blended light to the outside of the body cover 2.

Figure 8A:
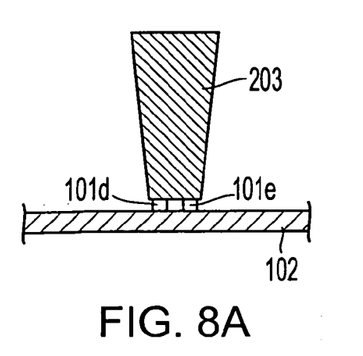
FIGS. 8A–8F show various variations of the first light guide.

Other embodiments of the electronic device of the invention will be explained below. In the second embodiment, as shown in FIG. 8A, a first light guide 203 is in the shape of a single trapezoid. The short side of the upper base (short side) and the lower base (long side) of the longitudinal section trapezoid of the first light guide 203 is installed in close proximity to the LEDs 101*d* and 101*e*. Simply stated, the width of the first light guide 203 on the side that is close to the LEDs 101*d* and 101*e* (the lower side in FIG. 6*b*) can be narrower than the width of the first light guide 203 on the side that is far from the LEDs 101*d* and 101*e* (the upper side in FIG. 6*b*). It is therefore possible to reduce the amount of material necessary for the formation of the first light guide 203 in comparison to the case in which the first light guide is formed into a cylindrical shape.

Figure 8B:
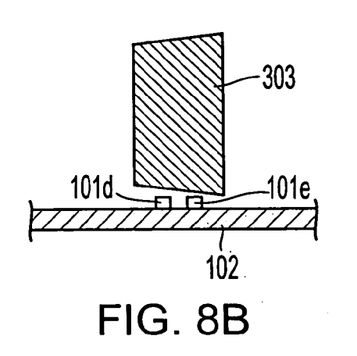

In the third embodiment, a first light guide 303 is in the shape of a single trapezoid, as in the second embodiment. But, as shown in FIG. 8B, the upper base and the lower base of the longitudinal section trapezoid of the first light guide 303 are arranged such that they are approximately perpendicular to substrate 102.

Figure 8C:
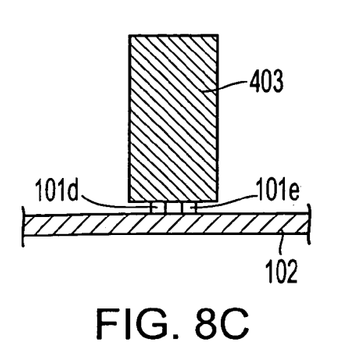

In the fourth embodiment, as shown in FIG. 8C, the shape of the longitudinal section of a first light guide 403 is rectangular. In other words, the first light guide 403 is formed into a cylindrical shape.

Figure 8D:
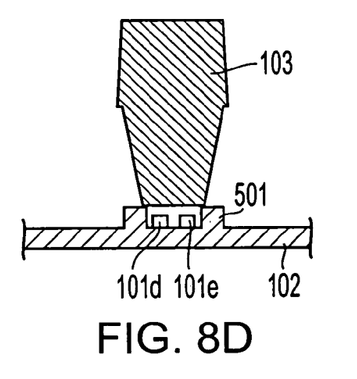

In the fifth embodiment, as shown in FIG. 8D, a gap is established between the first light guide 103 and the LEDs 101*d* and 101*e*. A rib 501, which is slightly taller than the LEDs 101*d* and 101*e*, is formed around the LEDs 101*d* and 101*e* on the substrate 102, and the short side of the first light guide 103 makes contact with the rib 501. A gap is thus formed between the first light guide 103 and the LEDs 101*d* and 101*e*. It is thus possible to absorb dimensional differences of the first light guide 103 with this gap, thus simplifying its structure.

Figure 8E:
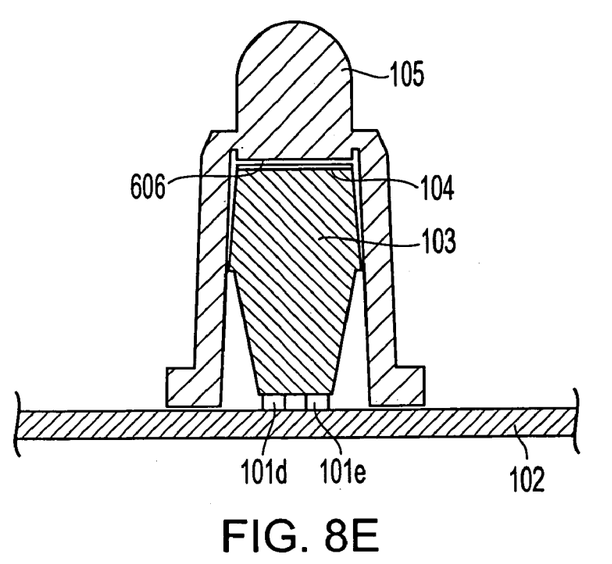
Figure 8F:
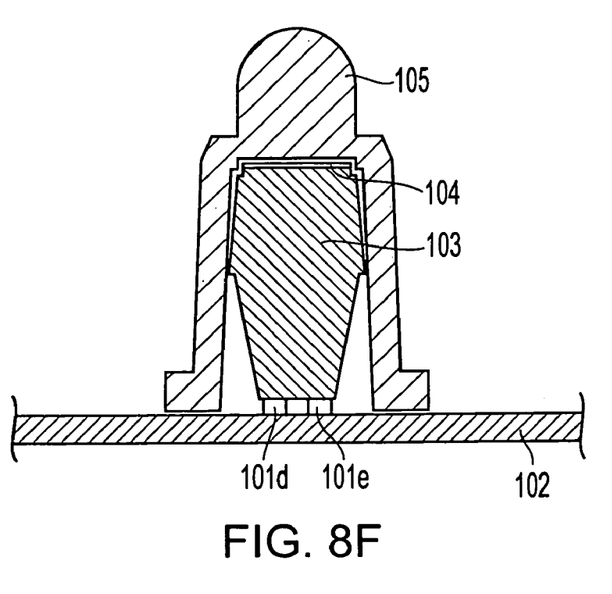

Moreover, in the sixth embodiment, as shown in FIG. 8E, a surface 606 of the second light guide 105 that opposes the first light guide 103 and the scattering member 104 is formed into a convex shape that projects towards the first light guide 103. As a result, it is easy for light from the LEDs 101*d* and 101*e* that is guided by the first light guide 103 to penetrate into the second light guide 105. Furthermore, in the seventh example of an embodiment, as shown in FIG. 8F, the first light guide 103 is press-fitted into the second light guide 105.

Figure 9:
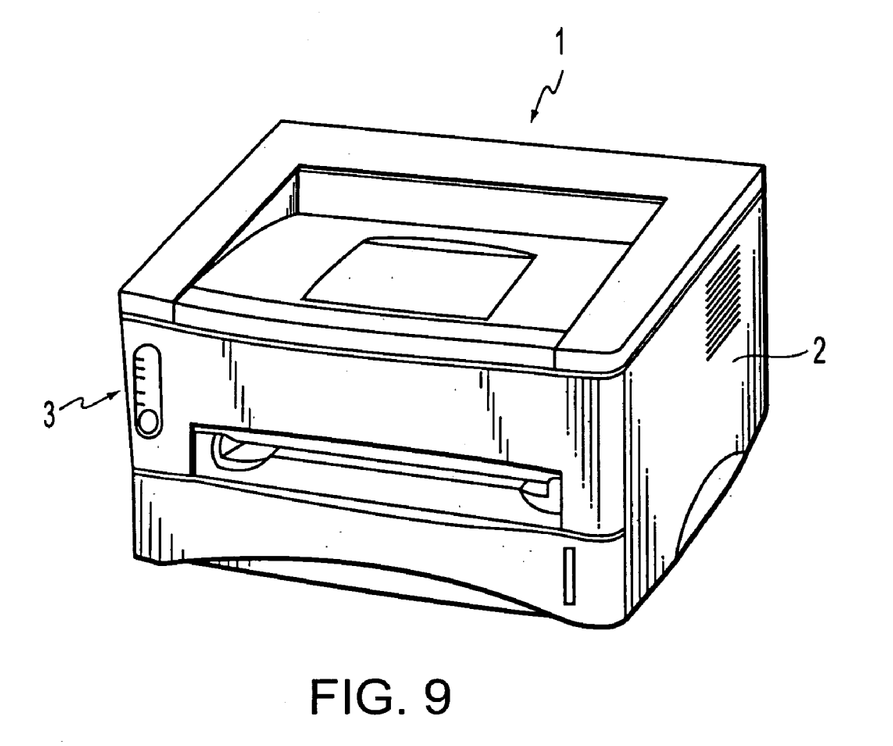
FIG. 9 shows an example in which a display panel is established on the front of a printer.

Moreover, as shown in FIG. 9, it is also possible to establish the display panel 3 on the front of body cover 2. Furthermore, it is also possible to form the first light guide 103 and the second light guide 105 with a material other than acryl that has favorable light transmission (glass, for example).

The embodiments described above need not be implemented independently, and may also be implemented in combination with one another.

According to an exemplary aspect of the invention, the first LED and the second LED are formed on a substrate. When the first LED and the second LED are connected to the substrate by a lead wire, it is necessary to attach the lead wire to the substrate manually. In contrast, the first LED and the second LED are established on the substrate in the electronic device as described. It is therefore possible to automate the attachment process between the first LED, the second LED, and the substrate.

According to another exemplary aspect of the invention, the longitudinal section shape of the first light guide is a trapezoid. In the described electronic device, the longitudinal section shape of the first light guide is trapezoidal. As such, it is possible to easily remove the first light guide from the die within the light guide is formed through molding.

According to another exemplary aspect of the invention, a shorter side of the longitudinal section trapezoid is placed in a position that is closer to the first LED and the second LED.

The first LED and the second LED are arranged in relatively close proximity in order to blend the light from the first and second LEDs. Also, because a width of the first light guide on the side that is close to the first and the second LEDs can be relatively narrow, the shorter side of the upper and the lower bases of the longitudinal section of the trapezoid of the first light guide is placed in a position that is closer to the first and second LEDs than the other side in the electronic device. Simply stated, the width of the first light guide on the side that is close to the first and second LEDs is made narrower than the width of the first light guide on the side that is far from the first and second LEDs. Therefore, when the width of the first light guide on the side that is close to the first and second LEDs and the width of the first light guide on the side that is far from the first and second LEDs are made equal, it is possible to reduce the amount of material required to form the first light guide in comparison to the case in which the first light guide is formed in a cylindrical shape, for example.

According to another exemplary aspect of the invention, the first light guide is installed such that the first light guide makes contact with the first LED or the second LED. The first light guide is installed such that the first light guide makes contact with the first or second LED. Therefore, it is possible to prevent light from the first and second LEDs from reflecting off the inlet surface of the first light guide, resulting in the reduction of the amount of light that passes through the inlet surface of the first light guide and penetrates into the first light guide, which results from configurations in which the first light guide is installed with spacing between the first and the second LEDs. Simply stated, it is possible to increase the amount of light that penetrates into the first light guide in comparison to the case in which the first light guide is installed with spacing between the first and the second LEDs.

According to another exemplary aspect of the invention, the electronic device is equipped with a scattering member for the purpose of scattering the light guided by the first light guide. According to another exemplary aspect of the invention, the scattering member is a film. A scattering member for the purpose of scattering the light guided by the first light guide is established. Preferably, a film is established as the scattering member. It is therefore possible to favorably blend the light from the first and the light form the second LEDs.

According to another exemplary aspect of the invention, the scattering member is installed on a side of the first light guide opposite to the first LED and the second LED. The scattering member is installed on a side opposite as the first and second LEDs on the first light guide. Therefore, it is possible to favorably blend the light from the first and second LEDs in comparison to the case in which the scattering member is installed between the first and the second LEDs and the first light guide.

According to another exemplary aspect of the invention, in order to guide the light guided by the first light guide to the outside of the cover, the electronic device is equipped with the second light guide that is installed such that it is exposed to the outside of the cover. A second light guide, for the purpose of guiding light guided by the first light guide to the outside of the cover, is established separately from the first light guide. Therefore, even when the design of the distance between the first or the second LED and the cover is changed, for example, it is possible to simply change the design of either the first or the second light guide and use the other as it is. Moreover, by installing a scattering member for the purpose of scattering light from the first and the second LEDs that is guided by the first light guide between the first and the second light guides, it is possible to protect the scattering member.

According to another exemplary aspect of the invention, the part of the surface of the second light guide that opposes the first light guide is a flat surface or a convex surface that projects towards the first light guide. The part of the surface of the second light guide that opposes the first light guide is a flat surface or a convex surface that projects towards the first light guide. It is therefore possible to avoid the situation in which it becomes difficult for the light from the first and the second LEDs that is guided by the first light guide to penetrate into the second light guide, which results from configurations in which the part of the surface of the second light guide that opposes the first light guide is a concave surface. Simply stated, the invention makes it easy for the light from the first and the second LEDs that is guided by the first light guide to penetrate into the second light guide.

According to another exemplary aspect of the invention, a gap is established between the first light guide and the second light guide. A gap is established between the first and the second light guides, so it is possible to absorb the common difference between the first and the second light guides with this gap.

According to another exemplary aspect of the invention, the portion of the surface of the second light guide that is exposed to the outside of the cover is surface-treated such that light from the first LED or the second LED that is guided by the second light guide is diffusely reflected. The portion of the surface of the second light guide that is exposed to the outside of the cover is surface-treated such that light from the first or the second LED that is guided by the second light guide is diffusely reflected. It is therefore possible to improve the directivity.

According to another exemplary aspect of the invention, other LEDs are formed on the substrate. Other LEDs are formed on the substrate on which the first and the second LEDs are established. Simply stated, the substrate serves as both a substrate for the first and the second LEDs and as a substrate for other LEDs. It is therefore possible to reduce the number of parts in comparison to the case in which a substrate for the first and the second LEDs and a substrate for other LEDs are established separately.

According to another exemplary aspect of the invention, the second light guide is installed in close proximity to the other LEDs. The second light guide is established in close proximity to the other LEDs. Simply stated, the second light guide extends to a position that is close to the other LEDs. Therefore, it is possible to avoid the situation in which the number of parts increases, which results from configurations in which another light guide is established separately between the other LEDs and the second light guide.

According to another exemplary aspect of the invention, the substrate is formed from a printed board and at least one connector and lead wire joint is established on the substrate. At least one connector and lead wire joint is established on the substrate, so it is possible to separate the substrate for the first and the second LEDs from the other substrate.

According to another exemplary aspect of the invention, in the first LED and the second LED are soldered to the substrate, the electronic device also has other electronic parts that are soldered to the substrate. Other electronic parts are also soldered to the substrate to which the first and the second LEDs are soldered. It is therefore possible to avoid the situation in which the number of parts increases, which results from configurations in which another substrate is established for other electronic parts.

According to another exemplary aspect of the invention, the electronic device is equipped with a first mode in which light from the first LED is emitted while light from the second LED is not emitted, a second mode in which light from the second LED is emitted while light from the first LED is not emitted, and a third mode in which light from both the first LED and the second LED is emitted. A first mode in which light from the first LED is emitted while light from the second LED is not emitted, a second mode in which light from the second LED is emitted while light from the first LED is not emitted, and a third mode in which light from both the first and second LEDs is emitted are established. It is therefore possible to form light of three different colors with two LEDs.

What is claimed is:

1. An electronic device, comprising:
   a cover;
   a first LED that is installed inside the cover, the first LED emitting light of a first color;
   a second LED that is installed inside the cover, the second LED emitting light of a second color;
   a first light guide that guides the light from the first LED and the second LED towards an outside of the cover, the light of the first color and the light of the second color being blended inside the first light guide, wherein the first LED or the second LED and the first light guide are formed as separate and detachable units; and
   a scattering member that scatters the light guided by the first light guide, wherein the scattering member is installed on a side of the first light guide opposite to the first LED and the second LED, wherein light is emitted in a first mode in which light from the first LED is emitted while light from the second LED is not emitted, a second mode in which light from the second LED is emitted while light from the first LED is not emitted, and a third mode in which light from both the first LED and the second LED is emitted.

2. The electronic device according to claim 1, wherein the first LED and the second LED are formed on a common substrate.

3. The electronic device according to claim 1, wherein the longitudinal section shape of the first light guide is a trapezoid.

4. The electronic device according to claim 3, wherein a shorter side of the longitudinal section trapezoid is placed closer to the first LED and the second LED.

5. The electronic device according to claim 1, wherein the first light guide is installed such that it makes contact with the first LED or the second LED.

6. The electronic device according to claim 1, wherein the scattering member is a film.

7. The electronic device according to claim 1, further comprising:
   a second light guide that guides the light guided by the first light guide, to the outside of the cover, wherein the second light guide is installed such that the second light guide is exposed to the outside of the cover.

8. The electronic device according to claim 7, wherein a part of a surface of the second light guide that opposes the first light guide is a flat surface.

9. The electronic device according to claim 7, wherein a part of a surface of the second light guide that opposes the first light guide is a convex surface that projects towards the first light guide.

10. The electronic device according to claim 7, wherein a gap is established between the first light guide and the second light guide.

11. The electronic device according to claim 7, wherein a portion of a surface of the second light guide that is exposed to the outside of the cover is treated such that the second light guide diffusely reflects light.

12. The electronic device according to claim 11, wherein the treatment is texturing.

13. The electronic device according to claim 7, wherein a third LED is further formed on the substrate.

14. The electronic device according to claim 13, wherein the second light guide is installed in close proximity to the third LED.

15. The electronic device according to claim 14, wherein the substrate is formed from a printed board and connectors are established on the substrate.

16. The electronic device according to claim 7, wherein the second light guide includes a stem with branches attached to the stem, the branches extending from another LED to the outside of the cover.

17. The electronic device according to claim 7, wherein the second light guide further comprises:
   a concave part in which the first light guide is installed.

18. The electronic device according to claim 17, further comprising:
   a scattering member provided between the first light guide and the second light guide, the scattering member scattering the light guided by the first light guide.

19. The electronic device according to claim 18, wherein the scattering member is installed on a side of the first light guide adjacent to the second light guide.

20. The electronic device according to claim 17, wherein a part of a surface of the second light guide that opposes the first light guide is a flat surface.

21. The electronic device according to claim 17, wherein a part of a surface of the second light guide that opposes the first light guide is a convex surface that projects towards the first light guide.

22. The electronic device according to claim 17, wherein a gap is established between the first light guide and the second light guide.

23. The electronic device according to claim 17, wherein a portion of a surface of the second light guide that is exposed to the outside of cover is treated such that the second light guide diffusely reflects light.

24. The electronic device according to claim 17, wherein a third LED is further formed on the substrate.

25. The electronic device according to claim 17, wherein the second light guide includes a stem with branches attached to the stem, the branches extending from another LED to the outside of the cover.

* * * * *